(12) United States Patent
Kanbayashi et al.

(10) Patent No.: US 11,565,704 B2
(45) Date of Patent: Jan. 31, 2023

(54) ROAD SURFACE CONDITION ESTIMATION DEVICE

(71) Applicant: DENSO CORPORATION, Kariya (JP)

(72) Inventors: Ryosuke Kanbayashi, Kariya (JP); Takatoshi Sekizawa, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 1016 days.

(21) Appl. No.: 16/326,939

(22) PCT Filed: Sep. 4, 2017

(86) PCT No.: PCT/JP2017/031838
§ 371 (c)(1),
(2) Date: Feb. 21, 2019

(87) PCT Pub. No.: WO2018/047780
PCT Pub. Date: Mar. 15, 2018

(65) Prior Publication Data
US 2019/0185008 A1    Jun. 20, 2019

(30) Foreign Application Priority Data

Sep. 6, 2016 (JP) .............................. JP2016-173733

(51) Int. Cl.
| | |
|---|---|
| *B60W 40/06* | (2012.01) |
| *G08G 1/00* | (2006.01) |
| *G08G 1/16* | (2006.01) |
| *B60T 8/171* | (2006.01) |
| *B60T 8/172* | (2006.01) |

(Continued)

(52) U.S. Cl.
CPC ............. *B60W 40/06* (2013.01); *B60C 23/00* (2013.01); *B60T 8/171* (2013.01); *B60T 8/172* (2013.01); *B60W 50/00* (2013.01); *G01B 17/08* (2013.01); *G01W 1/02* (2013.01); *G08G 1/00* (2013.01); *G08G 1/16* (2013.01); *B60C 19/00* (2013.01); *B60C 2019/004* (2013.01);
(Continued)

(58) Field of Classification Search
CPC ..................................................... B60W 40/06
See application file for complete search history.

(56) References Cited

U.S. PATENT DOCUMENTS 9,046,457 B2 *  6/2015  Hanatsuka ............ B60W 40/06
9,170,102 B2 * 10/2015  Hanatsuka ............ B60W 40/06
(Continued)

FOREIGN PATENT DOCUMENTS

| JP | 4439985 B2 | 3/2010 |
|---|---|---|
| JP | 2015174637 A | 10/2015 |

(Continued)

*Primary Examiner* — Michael A Berns
(74) *Attorney, Agent, or Firm* — Harness, Dickey & Pierce, P.L.C.

(57) ABSTRACT

When information related to road surface conditions is conveyed from a vehicle body side system to a tire-mounted sensor and the tire-mounted sensor determines the road surface condition, an integrated voltage value is corrected based on the information related to the road surface condition. It is thus possible to estimate the road surface condition more accurately. Furthermore, in as much as the road surface condition is estimated at each tire-mounted sensor, the road surface condition can be estimated for each wheel.

6 Claims, 8 Drawing Sheets

(51) Int. Cl.
  *B60C 23/00* (2006.01)
  *G01W 1/02* (2006.01)
  *B60W 50/00* (2006.01)
  *G01B 17/08* (2006.01)
  *B60C 19/00* (2006.01)

(52) U.S. Cl.
  CPC .. *B60T 2210/14* (2013.01); *B60W 2050/0057* (2013.01); *B60W 2555/20* (2020.02)

(56) References Cited

U.S. PATENT DOCUMENTS

| | | | |
|---|---|---|---|
| 10,086,842 B2 * | 10/2018 | Suzuki | B60C 19/00 |
| 10,099,699 B2 * | 10/2018 | Suzuki | B60W 40/06 |
| 10,858,009 B2 * | 12/2020 | Sekizawa | G01H 1/00 |
| 11,065,920 B2 * | 7/2021 | Kanbayashi | B60T 8/1725 |
| 11,091,163 B2 * | 8/2021 | Mori | B60W 50/029 |
| 11,145,142 B2 * | 10/2021 | Chainer | B62D 15/025 |
| 2016/0368501 A1 | 12/2016 | Suzuki et al. | |
| 2016/0368502 A1 | 12/2016 | Suzuki et al. | |
| 2017/0241778 A1 | 8/2017 | Hanatsuka et al. | |
| 2019/0185008 A1 * | 6/2019 | Kanbayashi | G08G 1/16 |

FOREIGN PATENT DOCUMENTS

| | | |
|---|---|---|
| JP | 2015174638 A | 10/2015 |
| JP | 2016080451 A | 5/2016 |

* cited by examiner

ROAD SURFACE CONDITION ESTIMATION DEVICE

CROSS REFERENCE TO RELATED APPLICATIONS

This application is a U.S. National Phase Application under 35 U.S.C. 371 of International Application No. PCT/JP2017/031838 filed on Sep. 4, 2017. This application is based on and claims the benefit of priority from Japanese Patent Application No. 2016-173733 filed on Sep. 6, 2016. The entire disclosures of all of the above applications are incorporated herein by reference.

TECHNICAL FIELD

The present disclosure relates to a road surface condition estimation device, which includes a tire-mounted sensor for detecting vibrations received by a tire and transmitting vibration data to a vehicle body side system, and estimates a road surface condition based on the vibration data.

BACKGROUND ART

Conventionally, a road surface condition estimation device includes a tire-mounted sensor provided on a rear side of a tire tread and estimates a coefficient of friction (hereinafter referred to as p) and the like of a travel road surface by detecting vibrations applied to a tire by the tire-mounted sensor and transmitting a vibration detection result to a vehicle body side system. A road surface μ value is usable for controlling vehicle motion such as an anti-lock brake system (hereinafter referred to as ABS) and automatic driving with high accuracy. For realization of such vehicle motion control, it is required to estimate the road surface μ value with high accuracy.

PRIOR ART LITERATURE

Patent Literature

Patent literature 1: JP 443985

SUMMARY OF INVENTION

However, in the conventional device, it is difficult to estimate the road surface μ value with high accuracy because the road surface condition is estimated by only transmitting the vibration detection result from the tire-mounted sensor to the vehicle body side system.

As a method of estimating the road surface μ value, there is a method of using the detection signal of a wheel speed sensor. However, since the road surface μ value is estimated based on wheel speeds of four wheels, the road surface μ value cannot be estimated for each wheel.

Further, although the road surface μ value is taken as one example of the road surface condition here, the same problem is present in estimation of a type of road surface such as a dry road, a wet road and a frozen road. It is required to detect the type of the road surface with much higher accuracy.

The present disclosure has an object to provide a road surface condition estimation device, which is capable of estimating a road surface condition more accurately and estimating a road surface condition wheel by wheel.

A road surface condition detection device according to one aspect of the present disclosure comprises a tire-mounted sensor and a vehicle body side system. The tire-mounted sensor is attached to a rear surface of a tire provided in a vehicle and includes a vibration detection unit for outputting a detection signal corresponding to a magnitude of vibrations of the tire, a signal processing unit for calculating a level of frequency components of the detection signal in one rotation of the tire and estimating a road surface condition based on the level of the high frequency components, a transmitter unit for transmitting road surface data indicating the road surface condition and a receiver unit for receiving information related to the road surface condition. The vehicle body side system is provided in a vehicle body side and includes a transceiver for receiving the road surface data transmitted from the transmitter unit, acquires information related to the road surface condition and transmits the information to the tire-mounted sensor, In this configuration, the signal processing unit corrects the level of the high frequency components based on the information related to the road surface data received by the receiver unit and estimates the road surface condition based on a corrected level of the high frequency components.

When the information related to the road surface condition is transmitted from the vehicle body side system to the tire-mounted sensor and the tire-mounted sensor determines the road surface condition, the level of the high frequency components is corrected based on the information related to the road surface condition. It is thus possible to estimate the road surface condition more accurately. Furthermore, in as much as the road surface condition is estimated at each tire-mounted sensor, it is possible to estimate the road surface condition for each wheel.

EMBODIMENT

Figure 1:
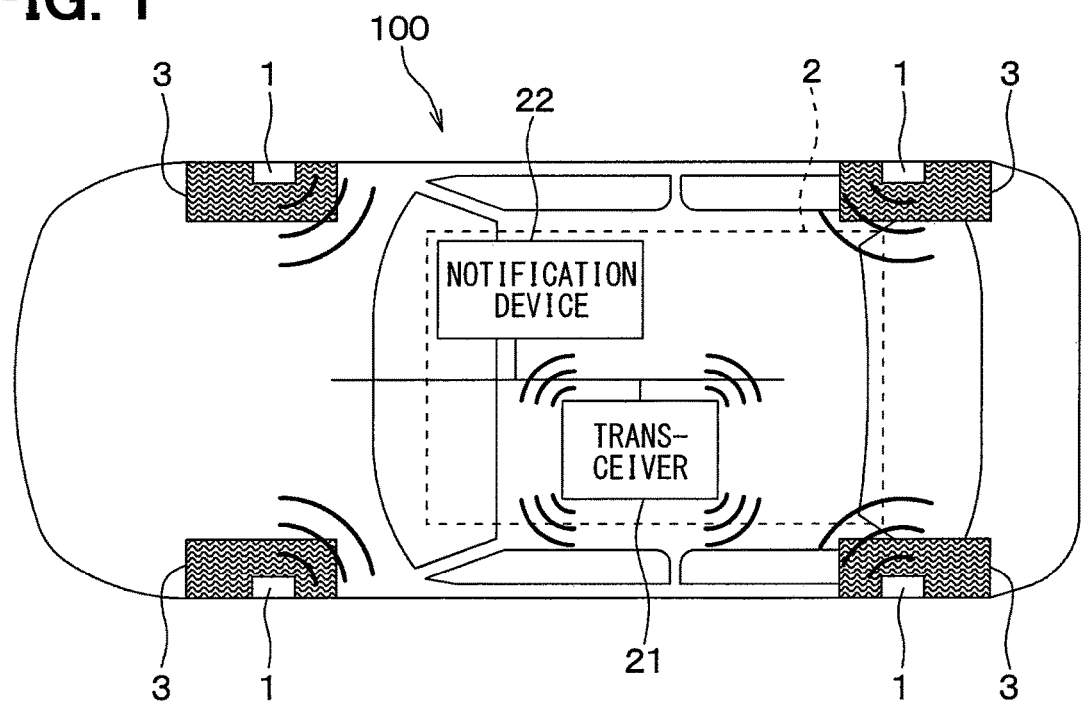
FIG. 1 is a view showing a block configuration of a road surface condition estimation device, to which a tire-mounted sensor according to a first embodiment is applied, under a state mounted in a vehicle.

Hereinafter, embodiments of the present disclosure will be described with reference to the drawings. In each embodiment described below, same or equivalent parts are designated with the same reference numerals.

First Embodiment

A road surface condition estimation device 100 including a tire-mounted sensor 1 according to the present embodiment will be described with reference to FIG. 1 to FIG. 12. The road surface condition estimation device 100 estimates a road surface condition on which a vehicle travels.

Figure 2:
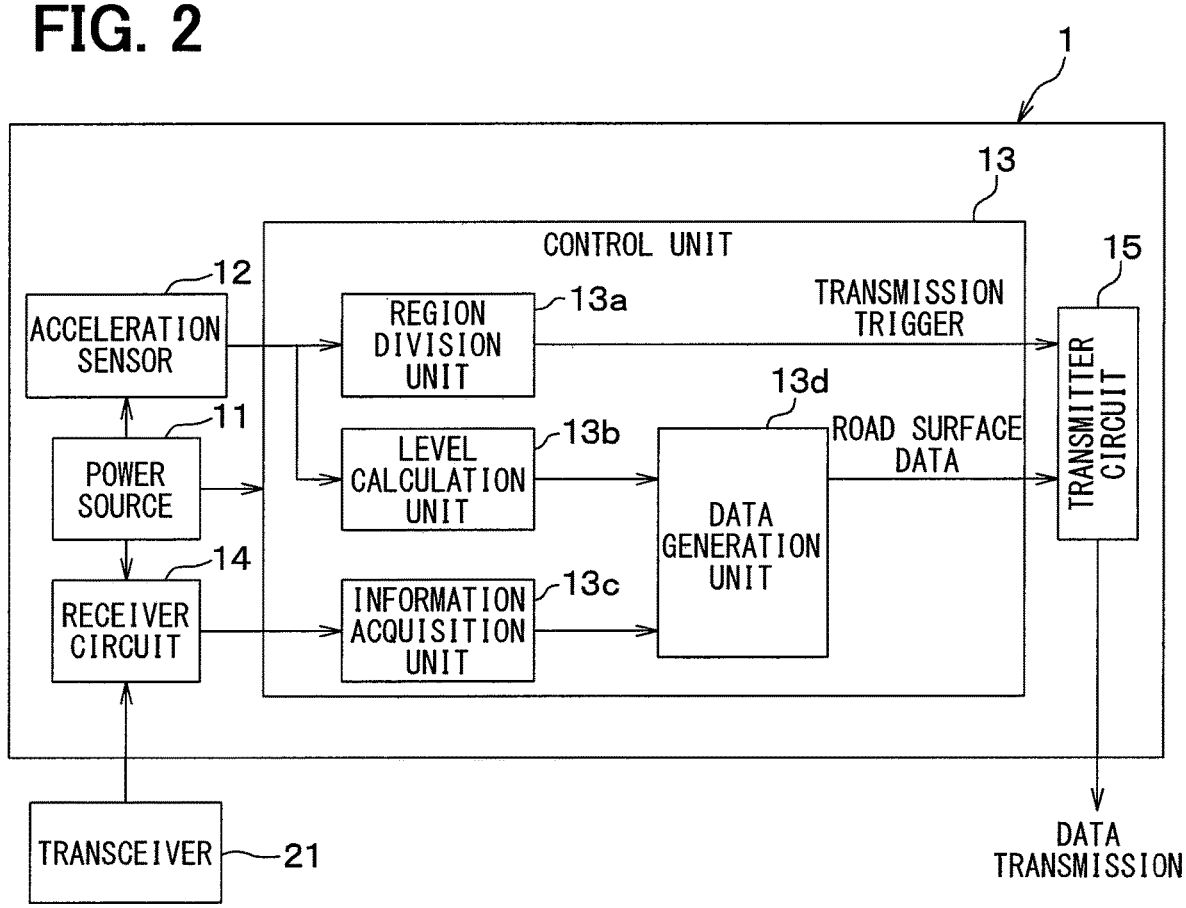
FIG. 2 is a block diagram of the tire-mounted sensor.

As shown in FIG. 1 and FIG. 2, the road surface condition estimation device 100 has a tire-mounted sensor 1 attached to each wheel side and a vehicle body side system 2 including various units mounted in a vehicle body side. As the vehicle body side system 2, a transceiver 21, a notification device 22 and the like are provided.

The road surface condition estimation device 100 detects vibrations of the tire 3 provided in each wheel by the tire mounted-sensor 1, generates data indicating a road surface condition of a vehicle travel road such as data indicating a road surface μ between the tire 3 and the vehicle travel road surface based on the vibration and transmits such data to the transceiver 21 side. Hereinafter, the data of the road surface μ is referred to as μ data and the data representing the road surface condition including such μ data is referred to as road surface data. The road surface condition estimation device 100 receives the road surface data transmitted from the tire-mounted sensor 1 by the transceiver 21 and conveys the road surface condition indicated by the road surface data from the notification device 22. It is thus made possible to notify a driver of the road surface condition, for example, that the road surface μ is low, a dry road, a wet road or a frozen road. It is also made possible to warn the driver if it is a slippery road surface. Specifically, the tire mounted-sensor 1 and the transceiver 21 are configured as follows.

Figure 3:
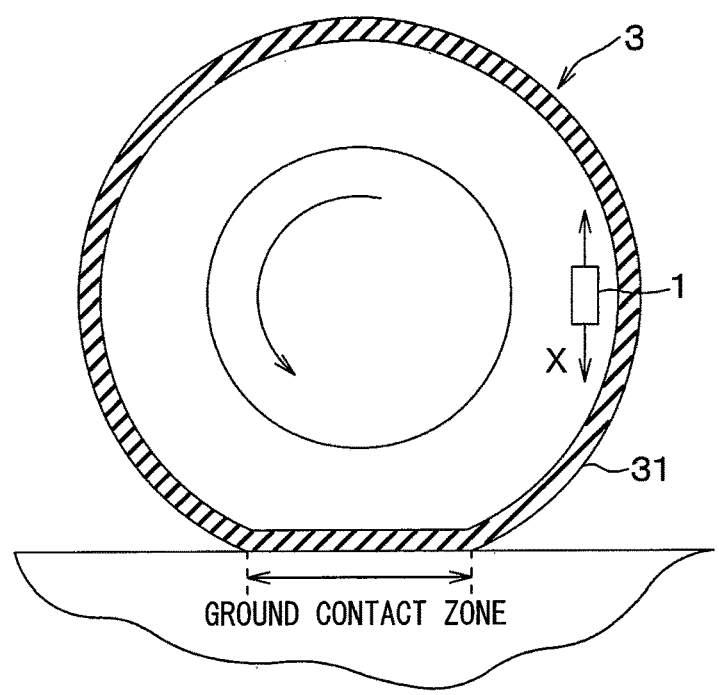
FIG. 3 is a sectional schematic view of a tire to which the tire-mounted sensor is attached.

The tire-mounted sensor 1 is a tire-side device provided at a tire side. As shown in FIG. 2, the tire-mounted sensor 1 is configured to include a power source 11, an acceleration sensor 12, a control unit 13, a receiver circuit 14 and a transmitter circuit 15. As shown in FIG. 3, the tire-mounted sensor 1 is provided on a rear surface side of a tread 31 of the tire 3.

The power source 11 is formed of a battery, for example, and supplies power to drive each component of the tire-mounted sensor 1.

The acceleration sensor 12 is configured as a vibration detection unit for detecting vibrations applied to a tire. For example, the acceleration sensor 12 outputs an acceleration detection signal as a detection signal corresponding to vibrations in a tire-tangential direction indicated with an arrow X in FIG. 3, that is, a direction tangential to a circular orbit which the tire-mounted sensor 1 depicts when the tire 3 rotates. For more details, the acceleration sensor 12 generates as the detection signal an output voltage, which is positive in one direction and negative in the opposite direction, between two directions indicated with the arrow X.

The control unit 13 is a signal processing unit. The control unit 13 operates to generate road surface data by using the detection signal of the acceleration sensor 12 as a detection signal, which indicates the vibration data in the tire-tangential direction, and processing this detection signal, and sends the road surface data to the transmitter circuit 16.

Specifically, the control unit 13 extracts a ground contact zone of the acceleration sensor 12 during rotation of the tire 3 based on the detection signal of the acceleration sensor 12, that is, a time change of the output voltage of the acceleration sensor 12. The control unit 13 further divides the rotation into regions of the ground contact zone and other zones. The ground contact zone means an area of a part of the tread 31 of the tire 3, which corresponds to the location of attachment of the acceleration sensor 12 and contacting the road surface. In the present embodiment, since the location of arrangement of the acceleration sensor 12 is the location of arrangement of the tire-mounted sensor 1, the ground contact zone is the same as the area of a portion of the tread 31 of the tire 3, which corresponds to the location of arrangement of the tire-mounted sensor 1 and is in contact with the road surface. In the following description, the location of arrangement of the tire-mounted sensor 1 in the tread 31 of the tire 3, that is, the location of arrangement of the acceleration sensor 12, is referred to as a device arrangement location.

Since high frequency components included in the detection signal of the acceleration sensor 12 indicate the road surface condition, the control unit 13 extracts the high frequency components from the detection signal and detects the road surface condition based on the extracted high frequency components.

For example, the level of the high frequency components included in the detection signal of the acceleration sensor in the ground contact zone indicates the road surface μ value or the type of the road surface as to whether it is a dry road, a wet road or a frozen road. Therefore, as described later, the control unit 13 extracts the high frequency components from the detection signal in the ground contact zone and detects the road surface μ value and the type of the road surface based on the extracted high frequency components. For example, the level of the high frequency components included in the detection signal of the acceleration sensor 12 in the regions other than the ground contact zone indicates the type of the road surface whether it is a snow-compacted road or non-snow-compacted road such as the dry road and the frozen road. Therefore, as described later, the control unit 13 extracts the high frequency components from the detection signal in the regions other than the ground contact zone and detects the type of the road surface based on the extracted high frequency components.

At this time, although it is possible to detect the road surface condition based on only the detection signal of the acceleration sensor 12, it is required to detect the road surface condition more accurately. Therefore, as will be described later, the control unit 13 acquires information related to road surface condition, such as weather information and temperature information, from the vehicle body side system 2, and performs correction based on these information so as to detect the road surface condition.

The control unit 13 thus detects the road surface condition, generates the road surface data indicating the road surface condition and executes processing of sending it to the transmitter circuit 15. The road surface data is thus sent to the transceiver 21 through the transmitter circuit 15.

More specifically, the control unit 13 is formed of a conventional microcomputer including a CPU, a ROM, a RAM, an I/O and the like and executes the processing described above based on a program stored in the ROM or the like. The control unit 13 includes, as functional units for executing such processing, a region division unit 13a, a level calculation unit 13b, an information acquisition unit 13c and a data generation unit 13d.

By detecting peak values of the detection signal represented by the output voltage of the acceleration sensor 12, the region division unit 13a divides the ground contact zone and regions other than the ground contact zone, that is, the pre-grounding region which precedes the ground contact zone and a post-kicking region which follows the ground contact zone.

Figure 4:
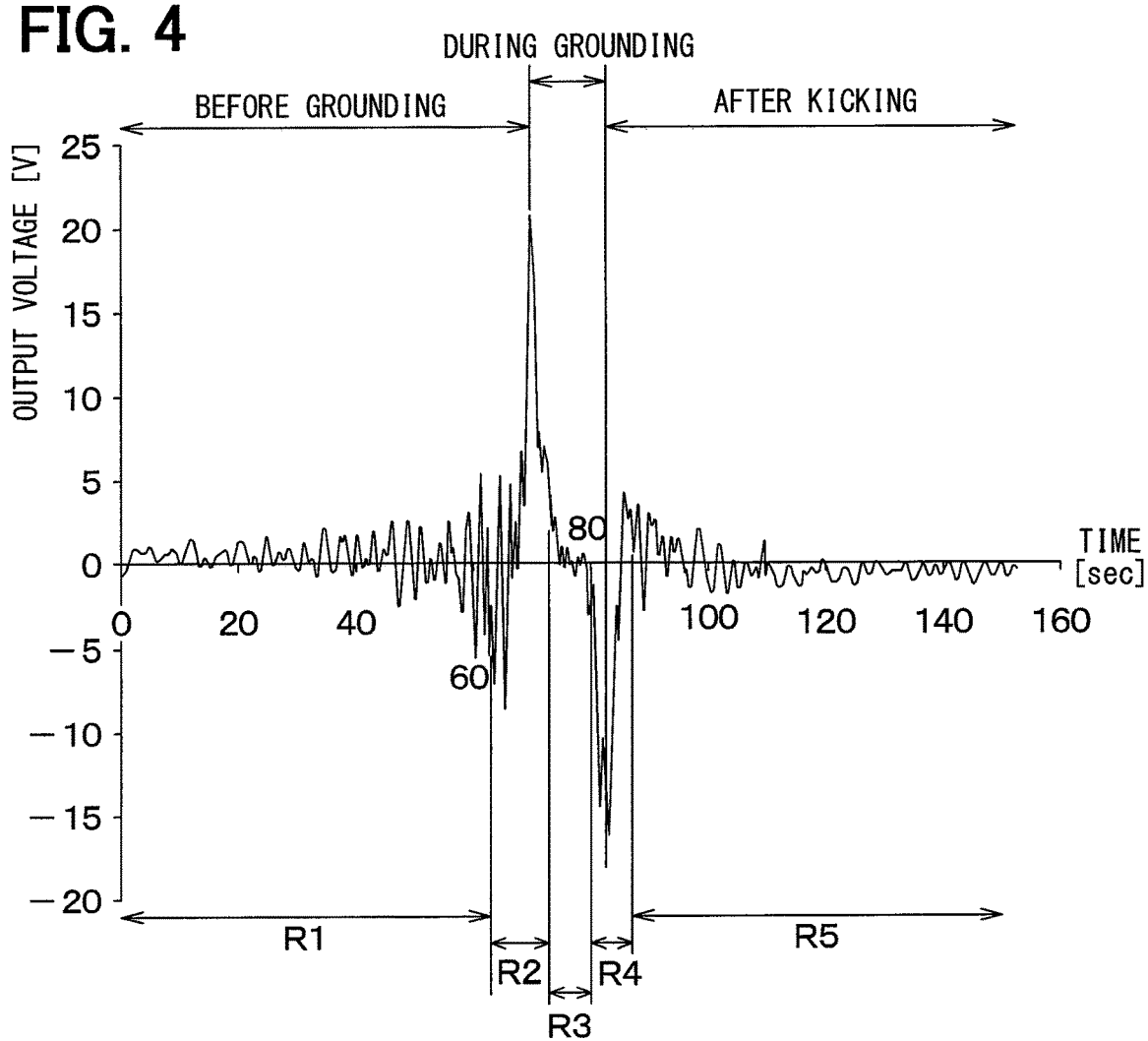
FIG. 4 is a diagram showing an output voltage waveform of an acceleration sensor during tire rotation.

The output voltage waveform of the acceleration sensor 12 during tire rotation changes as shown in FIG. 4, for example. As shown in this figure, at a ground contact start time at which the part corresponding to the device arrangement location starts contacting the ground during the rotation of the tire 3, the output voltage of the acceleration sensor 12 takes a maximum value. The region division unit 13a detects the ground contact start time, at which the output voltage of the acceleration sensor 12 takes the maximum value, as a first peak value timing. Further, as shown in FIG. 4, at a ground contact end time at which the part of the device arrangement location ends contacting the ground during rotation of the tire 3, the output voltage of the acceleration sensor 12 takes a minimum value. The region division unit 13a detects the ground contact end time at which the output voltage of the acceleration sensor 12 takes the minimum value as a second peak value timing.

The output voltage of the acceleration sensor 12 takes the peak values at the above-described timings for the following reasons. When the device arrangement location comes to contact the ground surface during rotation of the tire 3, the part of the tire 3 having been in generally cylindrical shape near the acceleration sensor 12 is pressed and deformed in a planar shape. Receiving an impact shock at this time, the output voltage of the acceleration sensor 12 takes the first peak value. When the part of the tire 3 corresponding to the device arrangement location leaves the ground surface during rotation of the tire 3, the part of the tire 3 is released from pressurization and restores to the generally cylindrical shape from the planar shape. Receiving the impact shock at the time of restoring the original shape of the tire 3, the output voltage of the acceleration sensor 12 takes the second peak value. As described above, the output voltage of the acceleration sensor 12 takes the first peak value and the second peak value at the ground contact start time and the ground contact end time, respectively. Since a direction of shock at the time when the tire 3 is pressed and a direction of shock at the time when the tire 3 is released from pressurization are opposite, polarities of the output voltages are also opposite.

The region division unit 13a extracts the ground contact zone of the acceleration sensor 12 by extracting the data of the detection signal including the timings of the first peak value and the second peak value and sends that it is within the ground contact zone to the level calculation unit 13b. Further, the region division unit 13a sets the region before the first peak value as a pre-grounding area, the region after the second peak value as a post-kicking region. The region division unit 13a sets an interval starting from the second peak value to the first peak value as a region other than the ground contact zone. Regions other than the ground contact zone may be set as one region or may be dividedly set as the pre-grounding region and the post-kicking region. A boundary between the pre-grounding region and the post-kicking region can be set at a time center from the second peak value to the first peak value or at a time point when the amplitude of the high frequency vibration becomes small.

Since the timing at which the output voltage of the acceleration sensor 12 has the second peak value is the ground contact end time of the acceleration sensor 11, the region division unit 13a sends a transmission trigger to the transmitter circuit 15 at this timing. As a result, the transmitter circuit 15 transmits the road surface data such as the μ data generated by the data generation unit 13d as described later. It is thus possible to reduce power consumption by executing the data transmission by the transmitter circuit 15 not continuously but limitedly at the ground contact end time of the acceleration sensor 12. Although the timing at which the output voltage of the acceleration sensor 12 takes the second peak value is exemplified to be the data transmission timing from the transmitter circuit 15, the data transmission timing may be other timings. Further, instead of performing data transmission once every rotation of the tire 3, the data may be transmitted once every plural rotations or plural times per rotation.

When it is sent from the region division unit 13a that it is within the ground contact zone, the pre-grounding region and the post-kicking region, the level calculation unit 13b calculates a level of predetermined frequency components, which arise from vibrations of the tire 3 and are included in the output voltage of the acceleration sensor 12 during the interval of each divided region. The level calculation unit 13b sends such a calculation result to the data generation unit 13d. Specifically, as an index representing the road surface condition such as the road surface μ, a level of frequency components of 2 to 5 kHz is calculated as the high frequency component in the ground contact zone. A level of frequency components of 0.1 to 0.2 kHz is calculated as the high frequency component in the pre-grounding region and the post-kicking region. The index described above is used for the following reasons described with reference to FIGS. 5A, 5B and 6.

Figure 5A:
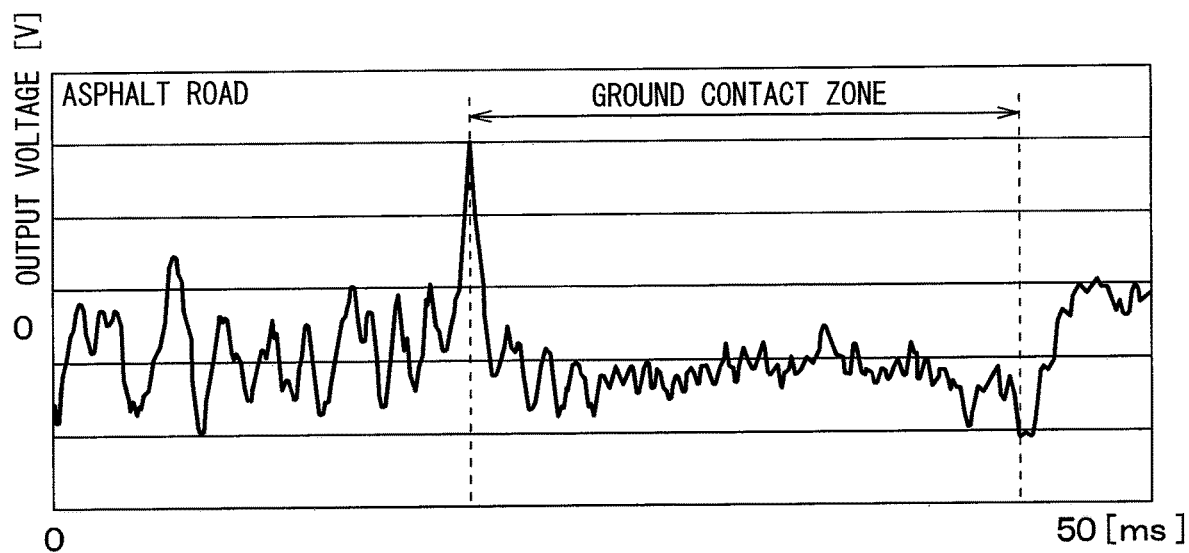
FIG. 5A is a chart showing a change in an output voltage of the acceleration sensor in case of traveling on a high μ road surface such as an asphalt road, a road surface μ of which is comparatively high.
Figure 5B:
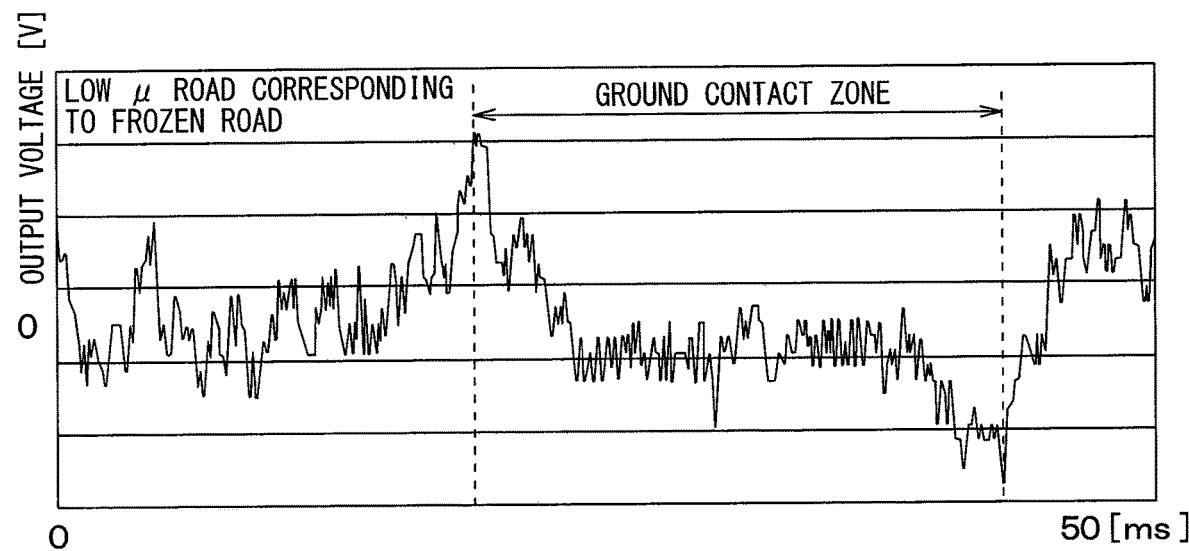
FIG. 5B is a chart showing a change in the output voltage of the acceleration sensor in case of traveling on a low μ road surface such as a frozen road, a road surface μ of which is comparatively low.

FIG. 5A shows a change of the output voltage of the acceleration sensor 12 in case of traveling on the high μ road surface like an asphalt road, the road surface μ of which is comparatively large. FIG. 5B shows a change of the output voltage of the acceleration sensor 12 in case of traveling on the low μ road surface like a road corresponding to a frozen road, the road surface μ of which is comparatively small.

As is evident from those figures, the first peak value and the second peak value appear at the start and the end of the ground contact zone, that is, the ground contact start time and the ground contact end time of the acceleration sensor 12, respectively, regardless of the road surface μ. However, the output voltage of the acceleration sensor 12 changes as affected by the road surface μ. For example, in case that the road surface μ is low like traveling on the low μ road surface, fine high frequency vibrations caused by slipping of the tire 3 are superimposed on the output voltage. This fine high frequency noise caused by slipping of the tire 3 is not superimposed so much in case that the road surface μ is high like traveling on the high μ road surface.

Figure 6:
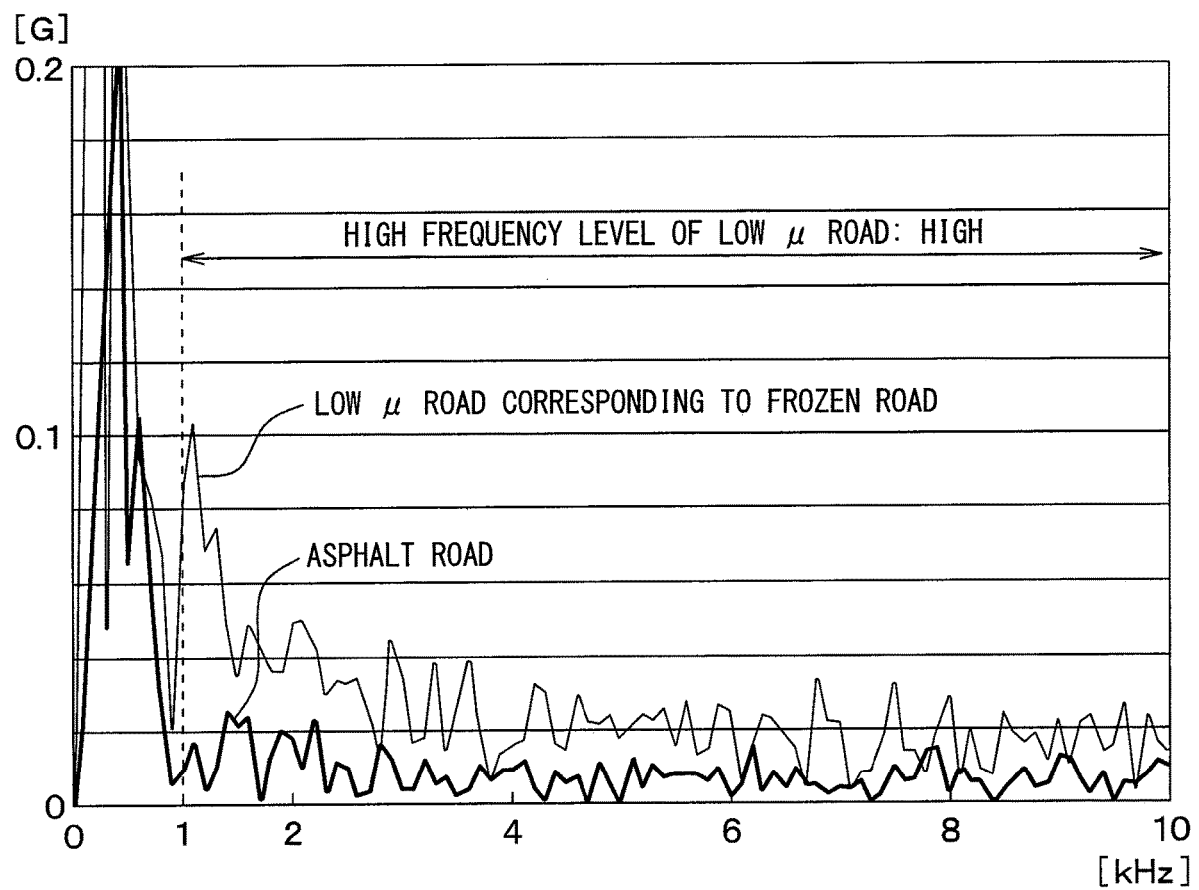
FIG. 6 is a chart showing a result of frequency analysis conducted on the output voltage during a period of a ground contact zone with respect to each case of traveling on the high μ road and the low μ road.

For this reason, frequency analysis of the output voltage in the ground contact zone with respect to the high road surface μ and low road surface μ produces results shown in FIG. 6. That is, in a low frequency band, the level is high regardless of traveling on the high μ road or on the low μ road. However, in a high frequency band of 1 kHz or more, the level is higher in case of the low road surface μ than in case of the high road surface μ. For this reason, the level of the high frequency components of the output voltage of the acceleration sensor 12 is the index indicating the road surface condition.

Therefore, by calculating the level of the high frequency components of the output voltage of the acceleration sensor 12 in the ground contact zone by the level calculation unit 13b, it is possible to use the calculated level as the data, which corresponds to the road surface condition such as the road surface μ. Further, it is also possible to detect a type of the road surface corresponding to the road surface μ as the road surface condition. For example, it is possible to determine the frozen road when the road surface μ is low.

For example, the high frequency component level is calculated as an integrated voltage value by extracting the high frequency components from the output voltage of the acceleration sensor 12 and integrating the high frequency components extracted during the interval of the ground contact zone. Specifically, the high frequency components of the frequency band fa to fb, in which it is assumed to change in correspondence to the road surface condition or the road surface μ, are extracted by filtering or the like and a voltage of the high frequency components in the frequency band fa to fb extracted by the frequency analysis is integrated to acquire the integrated voltage value. For example, the integrated voltage value is acquired by charging a capacitor (not shown). Thus the charge amount is greater in case that the road surface μ is low like traveling on the low μ road surface than in case that the road surface μ is high like traveling on the high μ road surface. By thus using the charge amount as the data corresponding to the road surface condition, it is possible to estimate the road surface μ is lower as the charge amount indicated by the data is greater.

Although the extraction of the high frequency components of the output voltage of the acceleration sensor 12 in the ground contact zone is described above, the same processing is made in the regions other than the ground contact zone. That is, in the pre-grounding region and the post-kicking region, the frequency components in the output voltage of the acceleration sensor 12, for example, the frequency components of 0.1 to 0.2 kHz, are not so large in case of the dry road and the wet road but large in case of the snow-compacted road. Therefore, by integrating the high frequency components of the output voltage of the acceleration sensor 12 to calculate the integrated voltage value in these regions, it is possible to discriminate road surfaces between the snow-compacted road and the other road and estimate the type of the road surface.

The information acquisition unit 13c acquires information related to the road surface condition from the vehicle body side system 2 through the receiver circuit 14 which will be described later and sends the information to the data generation unit 13d. The information related to the road surface condition means information that affects the road surface condition, such as weather information and temperature information. Regarding the weather information, it is information indicating weather such as fine weather, rainy weather, snow and the like, and the temperature information is information indicating the outside air temperature. For example, the road surface μ tends to be lower in case of the rainy weather or snow than in case of fine weather. Further, for example, on the frozen road, the high frequency components of the output voltage of the acceleration sensor 12 in the pre-grounding region and the post-kicking region tend to be larger than the dry road or the wet road. For this reason, the information that affects such a road surface condition is acquired from the vehicle body side system 2 and this information is transmitted to the data generation unit 13d.

The data generation unit 13d basically generates the road surface data based on the calculation result of the level calculation unit 13b. For example, the data generation unit 13d estimates the road surface condition by calculating the road surface μ and determining the type of the road surface based on the data corresponding to the road surface condition sent from the level calculation unit 13b and stores the data indicating the estimated condition as the road surface data. At this time, if the information related to the road surface condition is transmitted from the information acquisition unit 13c, the data generation unit 13d performs correction in estimating the road surface condition based on such information.

For example, in case of checking the road surface μ value based on the data corresponding to the road surface condition, it is checked whether the road surface is the low μ road surface or the high μ road surface based on whether the integrated voltage value in the ground contact zone is larger or smaller than a predetermined threshold value. At this time, if the acquired integrated voltage value is a value away from the threshold value as indicated by black circles (1) and (2) in FIG. 7, the integrated voltage value is simply compared with the threshold value. If the integrated voltage value is larger and smaller than the threshold value, it is determined that the road surface is the low μ road surface and the high μ road surface, respectively. However, if the integrated voltage value is located in the vicinity of the threshold value as indicated by a black circle in (3) in FIG. 7, accurate determination cannot be made. Therefore, by correcting the integrated voltage value based on the information related to the road surface condition, more accurate determination can be made.

Figure 7:
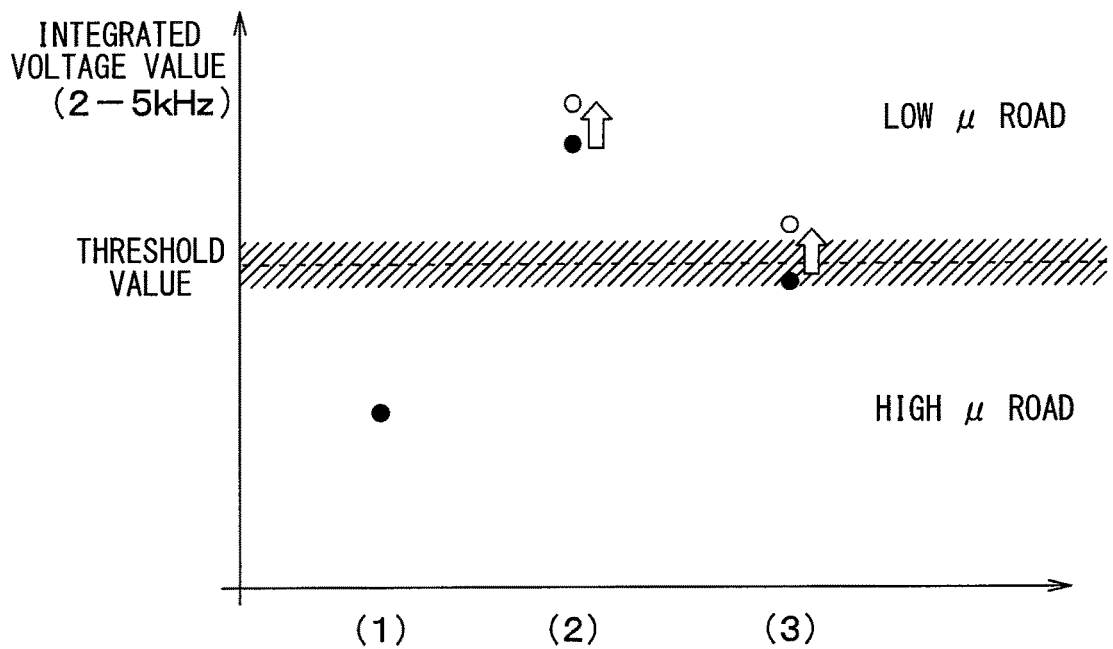
FIG. 7 is a diagram showing a result of calculation of an integrated voltage value of high frequency components of a detection signal of the acceleration sensor produced during the period of the ground contact zone and corrected integrated values with respect to three types of road surfaces.

Specifically, assuming that a correction constant in case the weather is sunny is 1 as shown in (1) in FIG. 7, for example, the integrate voltage value is corrected by multiplying by a correction coefficient larger than 1, for example 1.3 in case of rain as shown in (3) in FIG. 7. Similarly, even in case of snow as shown in (2) in FIG. 7 or in case of a negative outside air temperature value, the integrated voltage value is multiplied by a correction coefficient larger than 1, for example 1.5 times. In this way, correction is performed as indicated by white circles in FIG. 7. Even if the integrated voltage value before correction is a value in the vicinity of the threshold value, the integrated voltage value is corrected to deviate from the vicinity of the threshold value as a result of correction according to the road surface condition. Therefore, it is made possible to more accurately determine whether the road surface condition is the low μ road surface or the high μ road surface.

Figure 8:
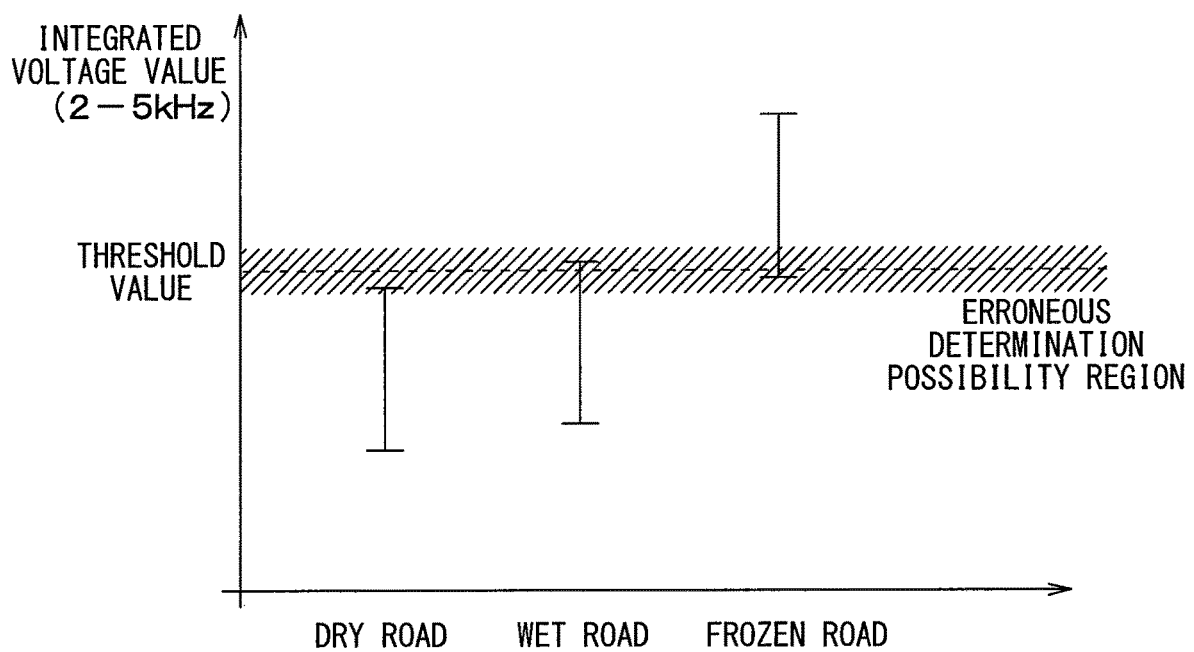
FIG. 8 is a diagram showing variations in the integrated voltage values calculated during the period of the ground contact zone.
Figure 9:
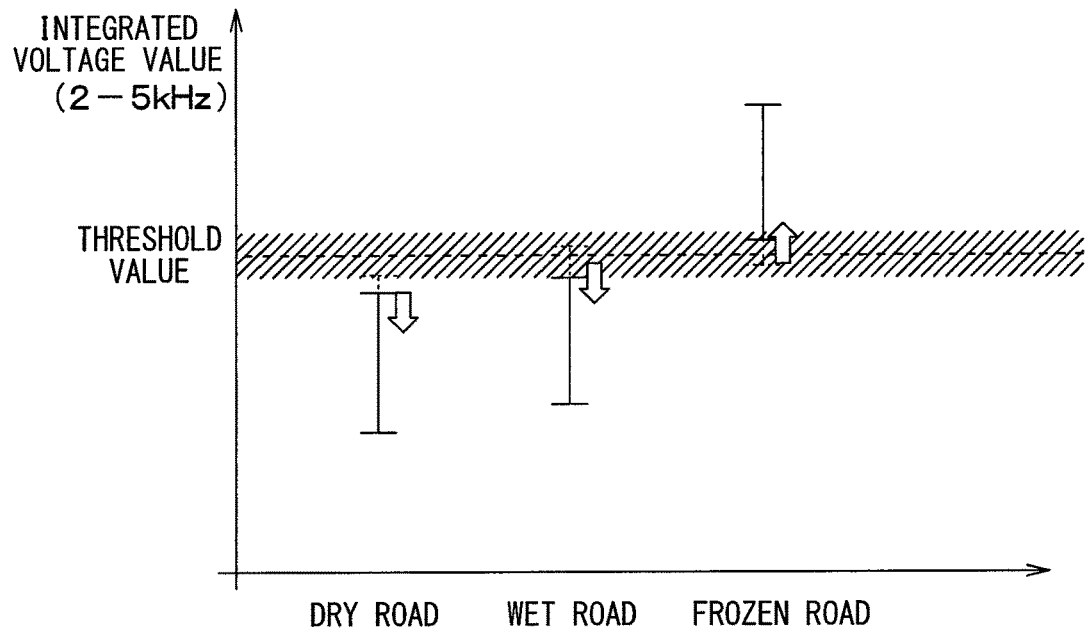
FIG. 9 is a diagram showing a state when the integrated voltage value having variations shown in FIG. 8 is corrected.

The same correction can be made in determining the type of road. For example, even in case of the same road surface, the integrated voltage value in the ground contact zone varies as shown in FIG. 8. For this reason, in case that the integrated voltage value is in the vicinity of the threshold value, it may occur that the integrated voltage value is included within an erroneous determination possibility range, in which the determination is likely to be made erroneously. In this case, as shown in FIG. 9, a correction constant for the integrated voltage value is determined so that the corrected integrated voltage value becomes smaller than the erroneous determination possibility range in, for example, the dry road and the wet road, which corresponds to the high μ road. Similarly, in the frozen road, for example, the correction constant for the integrated voltage value is determined so that the corrected integrated voltage value becomes larger than the erroneous determination possibility range.

For example, in case that the integrated voltage value is in the erroneous determination possibility range, a predetermined correction constant is subtracted from the integrated voltage value when the weather information indicates sunny or rain. Further, in case that the integrated voltage value is in the erroneous determination possibility region, a predetermined correction constant is added to the integrated voltage value when the outside air temperature is negative. As a result, even in case that the integrated voltage value is in the vicinity of the threshold value, the correction is made according to the road surface condition, so that it is separated from the vicinity of the threshold value. It is thus possible to estimate the type of the road surface more accurately.

Figure 10:
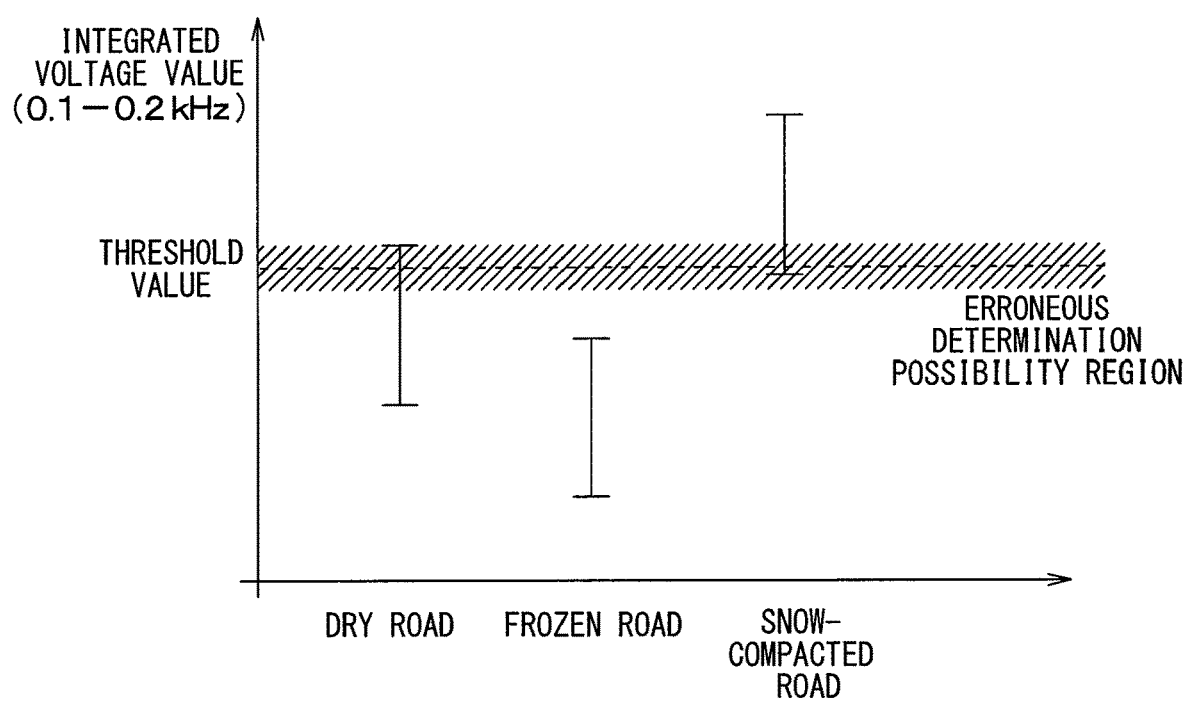
FIG. 10 is a diagram showing variations in the integrated voltage values calculated during a pre-grounding region and a post-kicking region.
Figure 11:
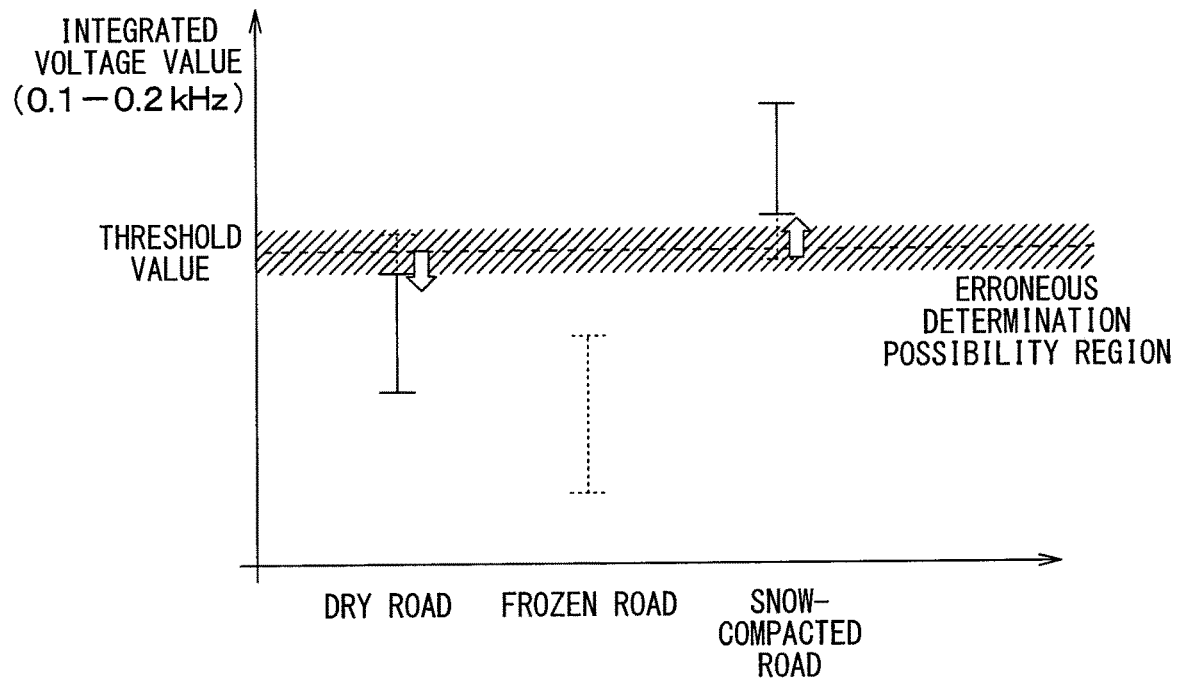
FIG. 11 is a diagram showing a state when the integrated voltage value having variations shown in FIG. 10 is corrected.

Furthermore, in case of determining the type of the road surface, the integrated voltage values in the pre-grounding region and the post-kicking region also have variations as shown in FIG. 10 even in case of the same type of road surfaces. For this reason, in case that the integrated voltage value is in the vicinity of the threshold value, it may occur that the integrated voltage value is included within the erroneous determination possibility range, in which the determination is likely to be made erroneously. In this case, as shown in FIG. 11, a correction constant for the integrated voltage value is determined so that the corrected integrated voltage value becomes smaller than the erroneous determination possibility range in, for example, the dry road. At this time, the integrated voltage value of the frozen road may also be corrected. However, as shown in FIG. 11, as far as the integrated voltage value before correction is away from the erroneous determination possibility range, it is allowable not to correct the integrated voltage value. Therefore, in this case, it is possible to prevent the correction from being made by setting the correction constant to 1. Similarly, in the snow-compacted road, for example, the correction constant for the integrated voltage value is determined so that the corrected integrated voltage value becomes larger than the erroneous determination possibility range.

For example, in case that the integrated voltage value is in the erroneous determination possibility range, a predetermined correction constant is subtracted from the integrated voltage value when the weather information indicates other than snow even in case that the outside temperature is negative. Further, in case that the integrated voltage value is in the erroneous determination possibility region, a predetermined correction constant is added to the integrated voltage value when the weather information indicates snow. As a result, even in case that the integrated voltage value is in the vicinity of the threshold value, the correction is made according to the road surface condition so that the integrated voltage value is separated from the vicinity of the threshold value. It is thus possible to estimate the type of the road surface more accurately.

The weighting is performed on the integrated voltage value using the correction coefficient and the correction constant used in the correction. It is preferable that the correction coefficient and the correction constant used for this weighting have vehicle speed dependency. That is, since the vibration of the tire 3 increases as the vehicle speed increases, it is preferable that the correction coefficient and the correction constant are made larger as the vehicle speed increases.

In this manner, the data generation unit 13*d* corrects the integrated voltage value of the output voltage of the acceleration sensor 12 in each region based on the information related to the road surface condition, estimates the road surface condition based on the corrected integrated voltage value, and generates the estimated road surface condition as the road surface data. Therefore, even in case where the integrated voltage value is included in the erroneous determination possibility range in the vicinity of the threshold value, the data generation unit 13*d* can accurately estimate the road surface condition and generate the road surface data.

The receiver circuit 14 is a receiver unit, which is a circuit that receives the information on the road surface and the like transmitted from the vehicle body side system 2. For example, since the information on the road surface is transmitted from the vehicle body side system 2 as an RF radio wave or an LF radio wave, the receiver circuit 14 is configured to receive it and sends it to the information acquisition unit 13*c*.

The transmitter circuit 16 forms a transmitter unit, which transmits to the transceiver 21 the road surface data such as the μ data sent from the data generation unit 13*d*. Communication between the transmitter circuit 15 and the transceiver 21 can be implemented by a known short-distance wireless communication technology such as Bluetooth (registered trademark), for example. The timing of transmitting the road surface data is arbitrary. In the present embodiment, as described above, when the transmission trigger is sent from the region division unit 13*a* at the ground contact end time of the acceleration sensor 11, the road condition data is transmitted from the transmitter circuit 15. It is thus possible to reduce power consumption by executing the data transmission by the transmitter circuit 15 not continuously but limitedly at the ground contact end time of the acceleration sensor 12.

The road surface data is transmitted together with the individual identification information (hereinafter referred to as ID information) of each wheel which is provided in advance for each tire 3 of the vehicle. The position of each wheel can be identified by a well-known wheel position detecting device that detects where the wheel is mounted on the vehicle. By transmitting the road surface data together with the ID information to the transceiver 21, it is possible to determine the wheel to which the road surface condition data corresponds.

The transceiver 21 receives the road surface data transmitted from the tire-mounted sensor 1, estimates the road surface condition based on the received road surface data, sends the estimated road surface condition to the notification device 22 and conveys, if necessary, the road surface condition to a driver from the notification device 22. Thus, the driver tries to drive the vehicle in a manner matching the road surface condition and is enabled to avoid danger to the vehicle. For example, the estimated road surface condition may be displayed always by the notification device 22 or the road surface condition may be displayed to warn the driver only when the vehicle need be driven more carefully than usual, for example, when the estimated road surface condition corresponds to the low μ road like the wet road or the frozen road. Further, by transmitting the road surface condition to an electronic control unit (hereinafter referred to as ECU) for vehicle motion control, for example, ECU for brake control, from the transceiver 21, the vehicle motion control can be attained based on the transmitted road surface condition.

In addition, the transceiver 21 acquires the weather information and the temperature information, and transmits them to each tire mounted-sensor 1. That is, the transceiver 21 and the tire-mounted sensor 1 are configured to be capable of bidirectional communication so that the transceiver 21 transmits the weather information and the temperature information to the tire-mounted sensor 1 and the tire-mounted sensor 1 transmits the road surface data to the transceiver 21. For example, in a facility kike a communication center that manages information related to roads such as communication centers, the weather information and the temperature information are also managed. The transceiver 21 acquires the weather information and the temperature information from the communication center through roadside equipment etc. located alongside the road. Although the transceiver 21 is exemplified here as a unit for acquiring the weather information and the temperature information in the vehicle body side system 2, it is not necessary for the transceiver 21 to directly acquire such information. Such information may be acquired from other ECUs, for example, a navigation ECU.

The notification device 22 is configured with a meter display device for example and used to notify the driver of the road surface condition. In case that the notification device 22 is configured with the meter display device, it is located at a position which the driver is capable of recognition during driving of the vehicle, for example, within an instrument panel in the vehicle 1. When the road surface condition is transmitted from the transceiver 21, the meter display device visually notifies the driver of the road surface condition by performing display in such a manner that the condition of the road surface can be grasped.

The notification device 22 may alternatively be configured with a buzzer or a voice guidance device. In such a case, the notification device 22 notifies the driver of the road surface condition audibly by buzzer sound or voice guidance. Although the meter display device has been exemplified as the notification device 22 providing visual notification, the notification device 22 may be configured with a display device that displays information such as a head up display.

The road surface estimation device 100 is configured as described above in the present embodiment. Each unit forming the vehicle body side system 2 is connected through an in-vehicle LAN (Local Area Network) like CAN (Controller Area Network) communication. Thus each unit is capable of communicating information mutually through the in-vehicle LAN.

An operation of the tire-mounted sensor 1 in the road surface condition estimation device 100 will be described next.

As described above, in the tire-mounted sensor 1, the control unit 13 analyzes the output voltage waveform based on the detection signal of the acceleration sensor 12 every time the tire 3 makes one rotation to acquire the road surface data. At the timing when the output voltage waveform reaches the second peak value, the transmission trigger is issued from the control unit 13 to the transmitter circuit 15 and the road surface data is transmitted.

On the other hand, when the data is transmitted from the transmitter circuit 15, the transceiver 21 receives the data, estimates the road surface condition based on the road surface data and transmits the estimated road surface condition to the notification device 22. Thus, it is possible to notify the driver of the condition of the road surface.

Such an operation is performed by the road surface condition estimation device 100 executing various processing systematically. This operation will be described with reference to a flowchart of various processing executed by the road surface condition estimation device shown in FIG. 12 as a system.

In the tire-mounted sensor 1, the control unit 13 executes processing of steps S100 to S150. It should be noted that these processing are executed by the control unit 13 at every predetermined control cycle with the power supply from the power source 11.

Specifically, as described in step S100, the vibration waveform of the output voltage of the acceleration sensor 12 produced during one rotation of the tire 3 is acquired and the vibration waveform is divided into each region. For example, it is divided into the pre-grounding region which is before the first peak value, the ground contact zone which is from the first peak value to the second peak value and the post-kicking region which is after the second peak value.

Subsequently, in step S110, for each region divided in step S100, the vibration of the output voltage waveform of the acceleration sensor 12 is frequency-analyzed. In step S120, the integrated voltage value of the high frequency components in the output voltage of the acceleration sensor 12 in each region is calculated by using the frequency analysis result of each region produced in step S110.

Thereafter, in step S130, based on the information such as the weather information and the temperature information related to the road surface condition and acquired from the vehicle body side system 2, the integrated voltage value of each region calculated in step S120 is corrected by the method described above when necessary. Then, in step S140, the road surface condition such as the road surface μ value and the type of the road surface is estimated by comparing the integrated voltage value, which is corrected when necessary, with the threshold value. For example, regarding the road surface μ value, it can be determined whether the road surface condition is the low μ road surface or the high μ road surface by comparing the integrated voltage value in the ground contact zone with the threshold value. Regarding the type of the road surface, in case of determination of the frozen road, it is possible to compare the integrated voltage value in the ground contact zone with the threshold value. The road surface condition is determined to be the frozen road and other than the frozen road in case that the integrated voltage value is larger and smaller than the threshold value, respectively. In case of determination of the snow-compacted road, it is possible to compare the integrated voltage values in the pre-grounding region and the post-kicking region with the threshold value. The road surface condition is determined to be the snow-compacted road and other than the snow-compacted road in case that the integrated voltage value is larger and smaller than the threshold value, respectively.

In this manner, when the road surface condition is estimated, the road surface data indicating the estimation result is generated and transmitted to the vehicle body side system 2 in step S150.

Thereafter, in the vehicle body side system 2, a control unit built in the transceiver 21 executes processing of step S160.

Specifically, in the vehicle body side system 2, the transceiver 21 receives the road surface data and acquires the estimation result of the road surface condition indicated by the road surface data. Then, transceiver 21 transmits the estimation result of the road surface condition to the notification device 22. It is thus made possible to notify a driver of the road surface condition, for example, that the road surface μ is low, a dry road, a wet road or a frozen road. It is also made possible to warn the driver if it is a slippery road surface. Further, by transmitting the road surface condition to a brake ECU or the like, the vehicle motion control according to the road surface condition can be executed.

As described above, when the information related to the road surface condition is transmitted from the vehicle body side system 2 to the tire-mounted sensor 1 and the tire-mounted sensor 1 determines the road surface condition, the integrated voltage value is corrected based on the information related to the road surface condition. It is thus possible to estimate the road surface condition more accurately. Furthermore, in as much as the road surface condition is estimated at each tire-mounted sensor 1, it is possible to estimate the road surface condition for each wheel.

Second Embodiment

A second embodiment will be described. The present embodiment is configured to estimate the road surface condition at the vehicle body side system 2 relative to the first embodiment. Since other configuration is the same as the first embodiment, only differences from the first embodiment will be described.

In the first embodiment, the information related to the road surface condition is transmitted from the vehicle body side system 2 to the tire-mounted sensor 1, and the road surface condition is estimated by the tire-mounted sensor 1. On the other hand, in the present embodiment, the vibration waveform itself of the output voltage of the acceleration sensor 12 or the integrated voltage value of each region is transmitted from the tire-mounted sensor 1 to the vehicle body side system 2 as the road surface data and the road surface condition is estimated based on the road surface data in the vehicle body side system 2.

In this case, since the vehicle body side system 2 has the information related to the road surface condition, the vehicle body side system 2 acquires the integrated voltage value of each region from the received road surface data and corrects the integrated voltage value based on the information related to the road surface condition if necessary. At this time, if the received road surface data indicates the vibration waveform itself of the output voltage of the acceleration sensor 12, the integrated voltage value of each region is calculated therefrom. Then, by comparing the corrected integrated voltage value with the threshold value, it is possible to estimate the road surface condition.

Figure 13:
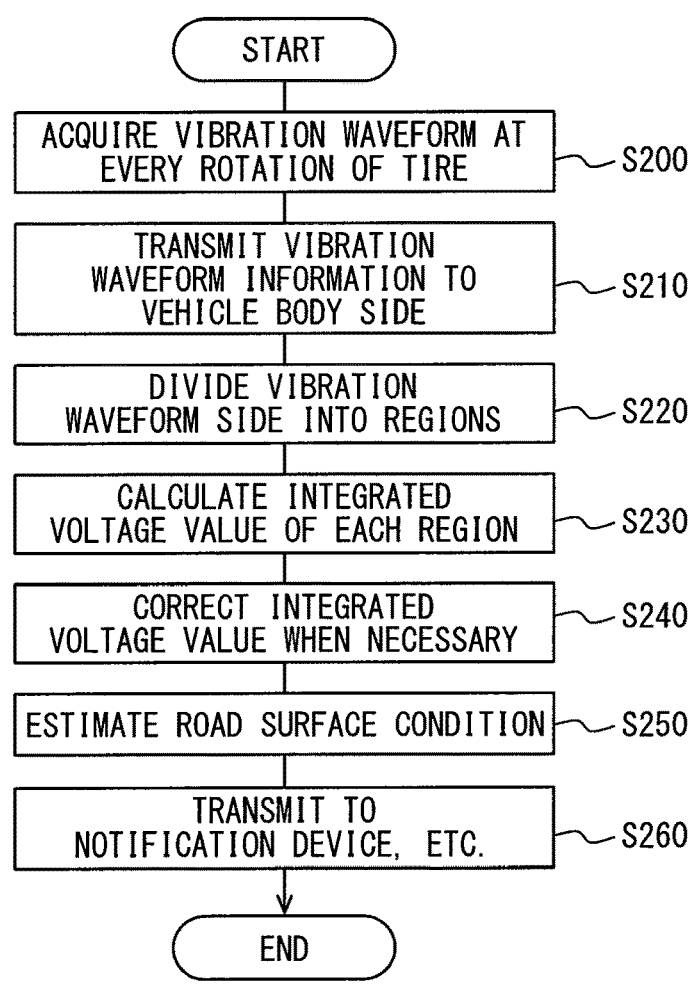
FIG. 13 is a flowchart of processing executed by the road surface condition estimation device as a system according to a second embodiment.

Specifically, the road surface condition estimation device 100 executes various processing shown in FIG. 13 to estimate the road surface condition. In the following description, it is assumed that the vibration waveform of the output voltage of the acceleration sensor 12 is directly used as the road surface data.

In the tire-mounted sensor 1, the control unit 13 executes processing of steps S200 and S210. That is, in step S200, the vibration waveform of the output voltage of the acceleration sensor 12 for one rotation of the tire 3 is acquired. In step S210, the information on the vibration waveform of the output voltage of the acceleration sensor 12 acquired in step S200 is transmitted to the vehicle body side system 2 as the road surface data.

Thereafter, in the vehicle body side system 2, the transceiver 21 executes step S220 and subsequent steps.

Figure 12:
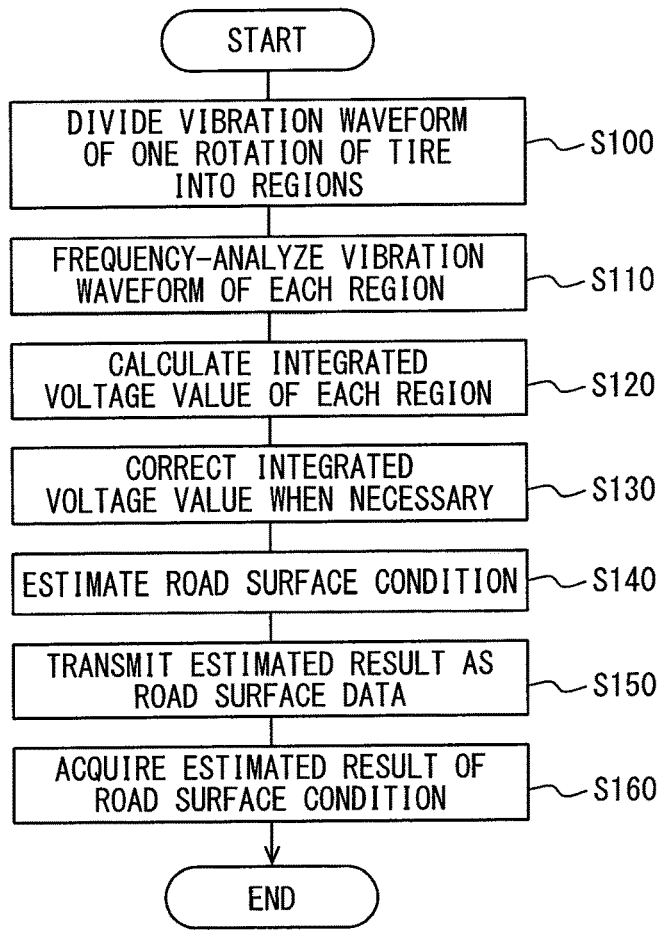
FIG. 12 is a flowchart of processing executed by the road surface condition estimation device shown in FIG. 1 as a system.

In steps S220 to S250, processing similar to steps S100 to S140 of FIG. 12 described in the first embodiment is executed. That is, in step S220, the vibration waveform is divided into each region based on the received information on the vibration waveform of the output voltage of the acceleration sensor 12. In step S230, the frequency analysis is executed on the vibration of the output voltage waveform of the acceleration sensor 12 with respect to each of the divided regions and the integrated voltage value of the high frequency components in the output voltage of the acceleration sensor is calculated by using the frequency analysis result of each region. Then, in step S240, based on the information such as the weather information and the temperature information related to the road surface condition, the integrated voltage value of each region calculated in step S230 is corrected. Then, in step S250, the road surface condition such as the road surface μ value and the type of the road surface is estimated by comparing the integrated voltage value, which is corrected when necessary, with the threshold value.

Then, in step S260, the estimation result of the road surface condition is transmitted from the transceiver 21 to the notification device 22. It is thus made possible to notify the driver of the road surface condition, for example, that the road surface μ is low, the road surface is dry, wet or frozen. It is also made possible to warn the driver if the road surface is slippery. Further, by transmitting the road surface condition to the brake ECU or the like, the vehicle motion control according to the road surface condition can be executed.

As described above, in the present embodiment, the vibration waveform itself of the output voltage of the acceleration sensor 12 or the integrated voltage value of each region is transmitted as the road surface data from the tire-mounted sensor 1 to the vehicle body side system 2 and the road surface condition is estimated based on the road surface data in the vehicle body side system 2. In this way, the road surface condition may be estimated in the vehicle body side system 2. Also in this case, it is possible to attain the same effect as in the first embodiment by correcting the integrated voltage value based on the information related to the road surface condition.

The tire-mounted sensor 1 used in the present embodiment is similar to that of the first embodiment. Since the present embodiment does not need the receiver function, the tire-mounted sensor 1 may be configured as a simple sensor transmitter. Also, the vehicle body side system 2 is configured to have the transceiver 21. Since it does not need the transmitter function, the transceiver 21 may be replaced with a simple receiver.

Other Embodiment

Although the present disclosure is made based on the embodiments described above, the present disclosure is not limited to such embodiments but may include various changes and modifications which are within equivalent ranges. In addition, while various combinations and configurations, which are preferred, other combinations and configurations including further only a single element, more or less, are also within the spirit and scope of the present disclosure.

For example, in the first embodiment described above, by dividing the detection signal of the acceleration sensor 12 forming the vibration detection unit into the ground contact zone and other regions, the road surface condition is estimated based on the calculation result of the level of the high frequency components of the detection signal in each region.

However, this is only one example of a method of detecting the road surface condition using the detection signal of the vibration detection unit. The road surface condition may be detected by any other methods which use the detection signal of the vibration detection unit.

For example, in the embodiments described above, the detection signal of the vibration detection unit is divided into three regions, that is, the ground contact zone, the pre-grounding region and the post-kicking region. However, this is merely one example. The detection signal may be divided differently, for example, into five regions. For example, as shown in FIG. 4, it may be divided into regions R1 to R5. Specifically, the moment when the device arrangement position contacts the road surface may be set as a kicking-in region, the moment when the device arrangement position leaves the road surface may be set as a kicking-out region and the moment before the kicking-in region may be set as a pre-kicking-in region. Further, the region from the kicking-in region to the kicking-out region, that is, the region in which the device arrangement position is in contact with the ground may be set as the pre-kicking-out region and the region after kicking may be set as the post-kicking-out region. Then, these regions may be sequentially set as the regions R1 to R5 according to time series. Even in such a division case, the road surface condition may be estimated by calculating the integrated voltage value of the vibration components of the detection signal of the vibration detection unit in a desired one of the regions R1 to R5.

Although the vibration detection unit is formed exemplarily of the acceleration sensor 12, the vibration detection unit may be configured by any other vibration detection elements, for example, a piezoelectric element or the like. In addition, the power source 11 is not limited to a battery but may be configured of a power generating element or the like. For example, in case of a vibration detection element, it may be used to form not only the vibration detection unit but also the power source 11.

Figure 14:
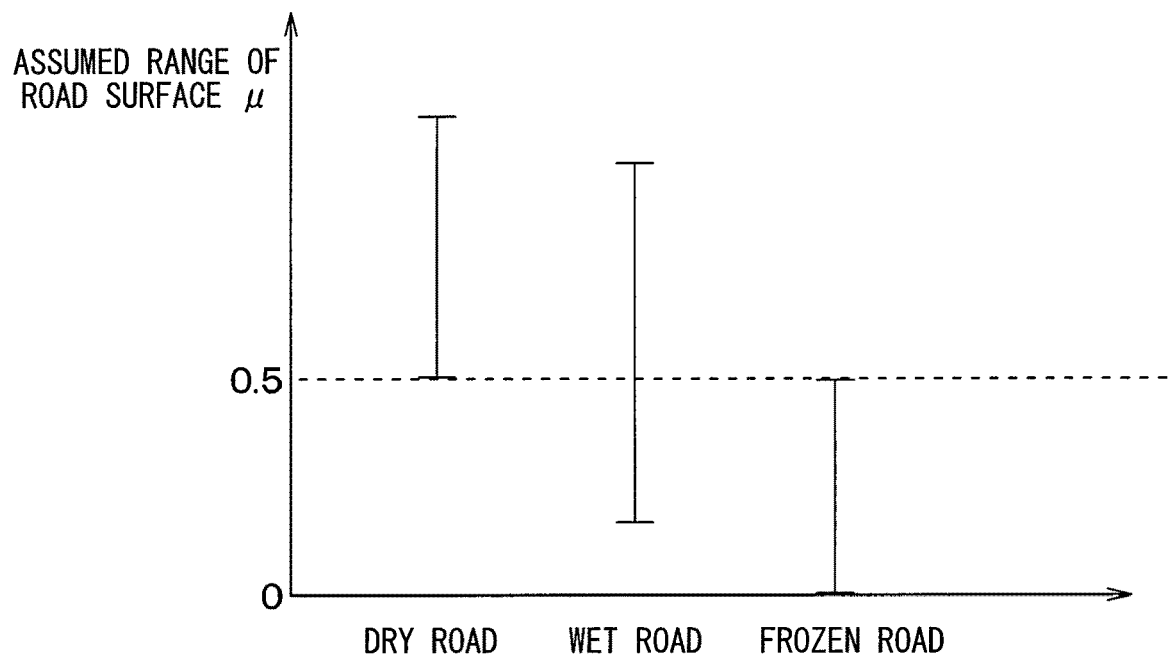
FIG. 14 is a diagram showing a relationship between a type of road surface and an assumed range of a road surface μ value.

Further, in case that the road surface μ value is calculated with reference to the weather information for checking the road surface μ value and the calculated road surface μ value is outside a road surface μ value, which is assumed based on each weather information, a check result made in one rotation of the tire 3 at that time may be suspended waiting for a check result of a next one rotation of the tire 3. For example, as shown in FIG. 14, it is assumed that the road surface μ value is 0.5 or more for the dry road, 0.2 or more for the wet road and 0.5 or less for the frozen road. In case that the road surface μ value acquired as a result of checking for one rotation of the tire 3 at that time is 0.7 under the outside air temperature −5° C. indicated by the temperature information for example, such a road surface μ value 0.7 is outside the range of 0.5 or less, which is the road surface μ value assumed as the frozen road. Therefore, in this case, the check result of the tire 3 for next one rotation is awaited. If the check result in the next one rotation is within the assumed range, the previous check result is canceled and the current check result is adopted as the road surface μ value.

The invention claimed is:

1. A road surface condition detection device for detecting a road surface condition of a road surface of travel of a vehicle comprising:
   a tire-mounted sensor attached to an inner surface of a tire provided in a vehicle and including a vibration detection unit for outputting a detection signal corresponding to a magnitude of vibrations of the tire, a signal processing unit for calculating a level of frequency components of the detection signal in one rotation of the tire and estimating a road surface condition based on a level of high frequency components, a transmitter unit for transmitting road surface data indicating the road surface condition and a receiver unit for receiving information related to the road surface condition; and
   a vehicle body side system provided in a vehicle body side and including a transceiver for receiving the road surface data transmitted from the transmitter unit, acquiring information related to the road surface condition and transmitting the information related to the road surface condition to the tire-mounted sensor,
   wherein the signal processing unit corrects the level of the high frequency components based on the information related to the road surface condition received by the receiver unit,
   wherein the high frequency components are frequency components having a frequency equal to or higher than a predetermined frequency, and
   wherein the level of the high frequency components is calculated as an integrated voltage value by extracting the high frequency components from an output voltage of the vibration detection until and integrating the high frequency components extracted during an interval of a ground contact zone.

2. The road surface condition detection device according to claim 1, wherein:
   the signal processing unit divides the detection signal in one rotation of the tire into plural regions and calculates the level of the high frequency components in the detection signal in each of the divided plural regions;
   the signal processing unit calculates the level of the high frequency components in the detection signal produced in a ground contact zone which is one of the plural regions and a part where a location of the vibration detection unit contacts a ground;
   the signal processing unit corrects the level of the high frequency components in the ground contact zone based on the information related to the road surface condition; and
   the signal processing unit compares a corrected level of the high frequency components with a predetermined threshold value thereby to estimate the road surface condition.

3. The road surface condition detection device according to claim 2, wherein:
   the signal processing unit calculates the level of the high frequency components in the detection signal in each of a pre-grounding region and a post-kicking region, which precedes and follows the ground contact zone of the tire where the location of the vibration detection unit contacts the ground, respectively;
   the signal processing unit corrects the level of the high frequency components in each of the pre-grounding region and the post-kicking region based on the information related to the road surface condition; and
   the signal processing unit compares each of corrected levels of the high frequency components with the predetermined threshold value thereby to estimate the road surface condition.

4. The road surface condition detection device according to claim 1, wherein:
   the information related to the road surface condition includes weather information indicating weather and temperature information indicating an outside temperature.

5. A road surface condition detection device for detecting a road surface condition of a road surface of travel of a vehicle comprising:
- a tire-mounted sensor attached to an inner surface of a tire provided in a vehicle and including a vibration detection unit for outputting a detection signal corresponding to a magnitude of vibrations of the tire, a signal processing unit for generating road surface data in one rotation of the tire, and a transmitter unit for transmitting the road surface data; and
- a vehicle body side system provided in a vehicle body side and including a receiver for receiving the road surface data transmitted from the transmitter unit and estimating a road surface condition based on a level of high frequency components of the detection signal in one rotation of the tire indicated by the road surface data, wherein:
- the receiver acquires information related to the road surface condition, corrects the level of the high frequency components based on the information related to the road surface condition and estimates the road surface condition based on a corrected level of the high frequency components;
- the receiver divides the detection signal in one rotation of the tire into plural regions and calculates the level of the high frequency components in the detection signal in each of the divided plural regions;
- the receiver calculates the level of the high frequency components in the detection signal produced in a ground contact zone which is one of the plural regions and a part where a location of the vibration detection unit contacts a ground;
- the receiver corrects the level of the high frequency components in the ground contact zone based on the information related to the road surface condition;
- the receiver compares a corrected level of the high frequency components with a predetermined threshold value thereby to estimate the road surface condition;
- the receiver calculates the level of the high frequency components in the detection signal in each of a pre-grounding region and a post-kicking region, which precedes and follows the ground contact zone of the tire where the location of the vibration detection unit contacts the ground, respectively;
- the receiver corrects the level of the high frequency components in each of the pre-grounding region and the post-kicking region based on the information related to the road surface condition;
- the receiver compares each of corrected levels of the high frequency components with the predetermined threshold value thereby to estimate the road surface condition;
- the high frequency components are frequency components having a frequency equal to or higher than a predetermined frequency; and
- the level of the high frequency components is calculated as an integrated voltage value by extracting the high frequency components from an output voltage of the vibration detection unit and integrated the high frequency components extracted during an interval of the ground contact zone.

6. The road surface condition detection device according to claim 5, wherein:
- the information related to the road surface condition includes weather information indicating weather and temperature information indicating an outside temperature.

* * * * *